United States Patent
Bailey

[19]

[11] Patent Number: 6,157,824
[45] Date of Patent: Dec. 5, 2000

[54] VIRTUAL CREDIT CARD ACCESS DEVICE FOR MOBILE COMMUNICATIONS EQUIPMENT

[76] Inventor: Kenneth S. Bailey, 9730 Wilshire Blvd. Ste. 116, Beverly Hills, Calif. 90212

[21] Appl. No.: 09/041,360

[22] Filed: Mar. 2, 1998

[51] Int. Cl.[7] .................................................. H04M 11/00
[52] U.S. Cl. ........................................ 455/409; 379/91.01
[58] Field of Search ..................................... 455/406, 405, 455/409, 407, 408, 410, 426, 11.1, 41, 556–558; 379/357, 144, 91, 111, 112, 113, 114, 115, 145, 154, 188, 189, 91.01–91.02, 442–3; 340/904

[56] References Cited

U.S. PATENT DOCUMENTS

| | | | |
|---|---|---|---|
| 4,776,003 | 10/1988 | Harris | 455/407 |
| 4,831,647 | 5/1989 | D'Avello et al. | 455/408 |
| 4,951,308 | 8/1990 | Bishop et al. | 379/91.01 |
| 4,965,821 | 10/1990 | Bishop et al. | 455/409 |
| 5,325,418 | 6/1994 | McGregor et al. | 455/408 |
| 5,388,148 | 2/1995 | Seiderman | 455/404 |
| 5,524,072 | 6/1996 | Labaton et al. | 380/24 |
| 5,850,599 | 12/1998 | Seiderman | 379/144 |

OTHER PUBLICATIONS

Exxon Mobil. Mobil Speedpass: How It Works, http://www.exxonmobile.com/speedpass pp. 1–8, Apr. 2000.

*Primary Examiner*—Dwayne D. Bost
*Assistant Examiner*—Charles Craver
*Attorney, Agent, or Firm*—John M. Johnson; Kaye, Scholer, Fierman, Hays & Handler LLP

[57] ABSTRACT

In mobile telephone communication equipment that is not owned by the user, but merely rented ad-hoc, a method for paying for the use of the equipment and any attendant call charges or other fees is described herein. The apparatus consists of a proximity device previously loaded with the user's credit card locator designation (i.e. an alpha-numeric string which identifies the particular user and his credit card account). The wireless transmission unit module, the receiver unit and the mobile unit being accessed thereby. When the user is within the vehicle, which constitutes a reasonable proximity between the hand held transmitter and the receiving unit, the transceiver transmits its user personality data to the receiving unit thereby identifying the user and allowing access to the equipment for purposes such as placing a telephone call.

3 Claims, 3 Drawing Sheets

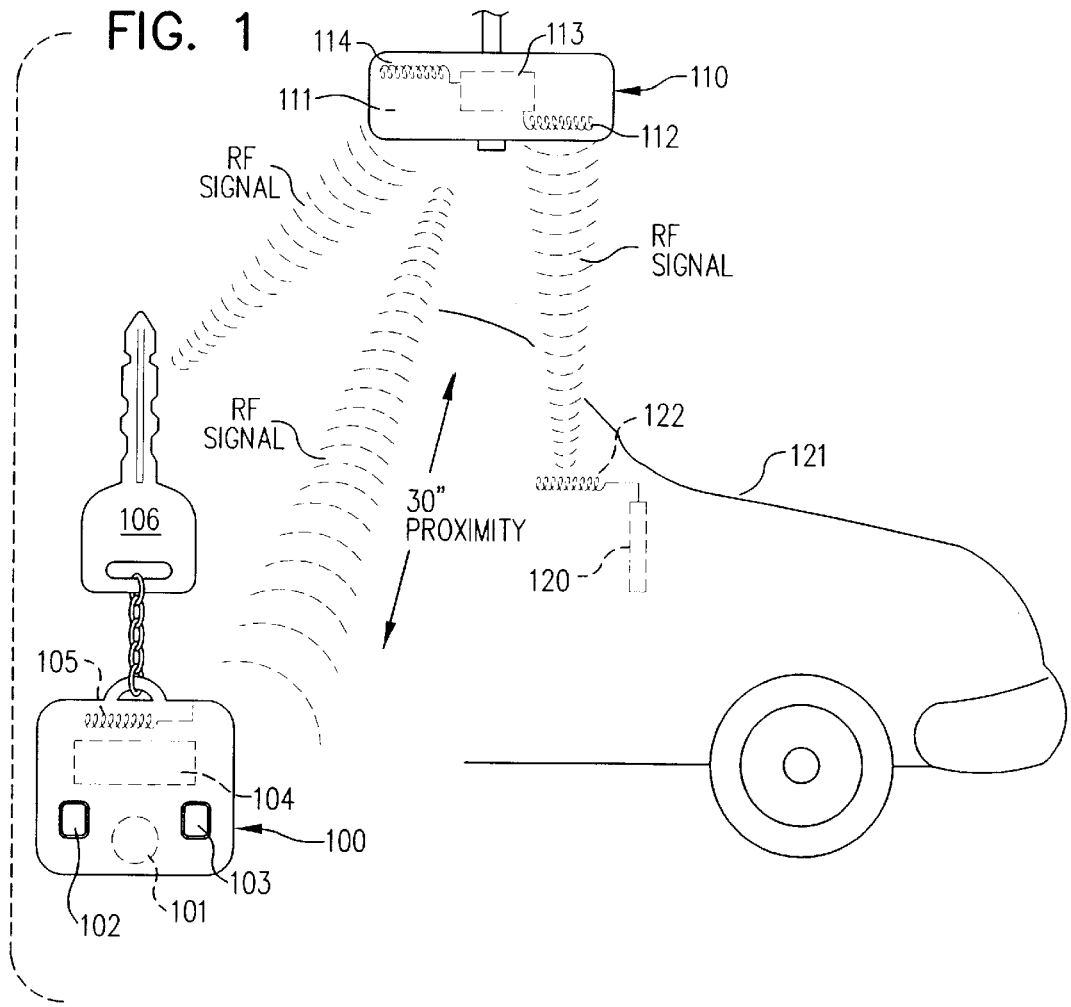

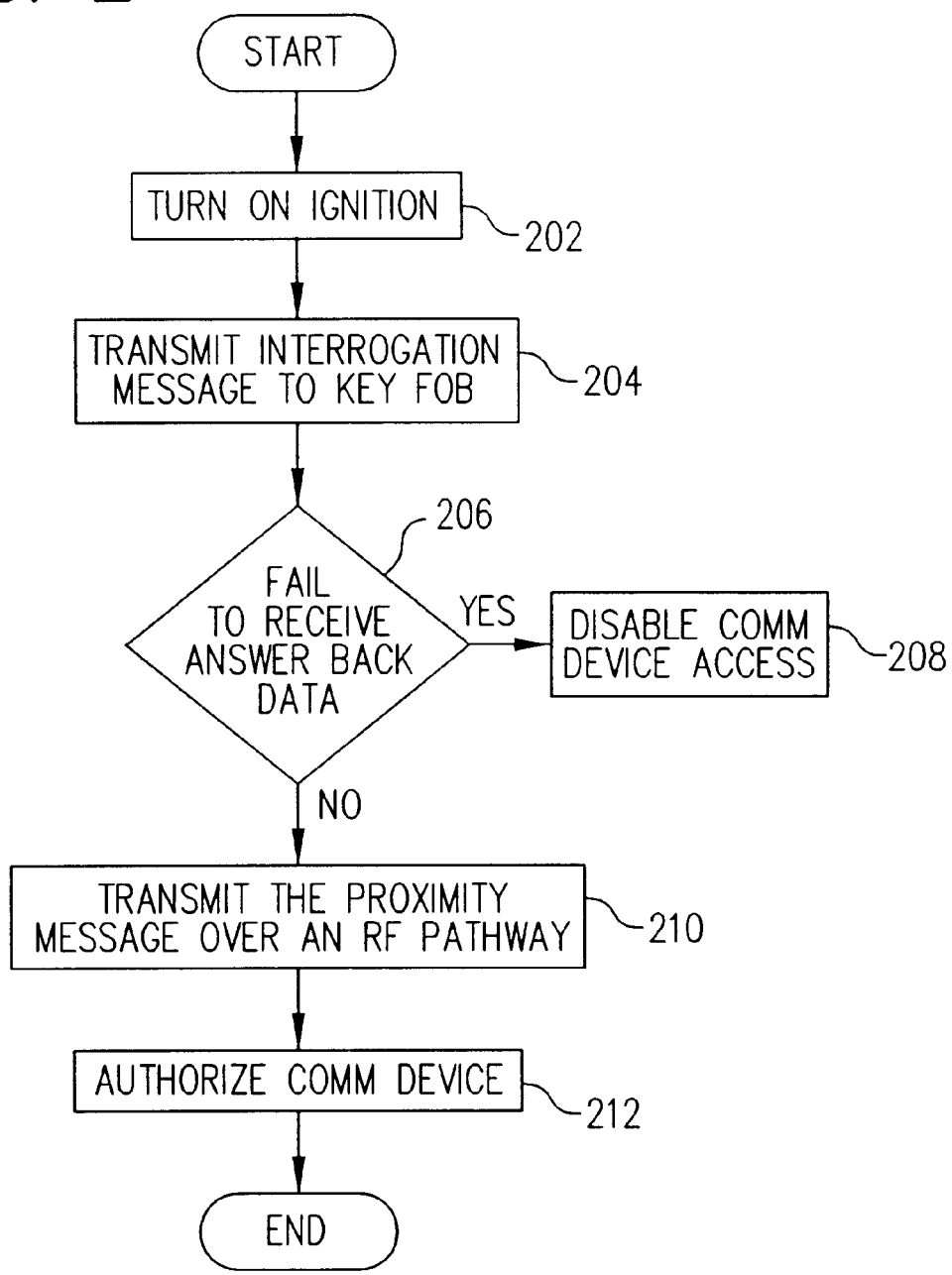

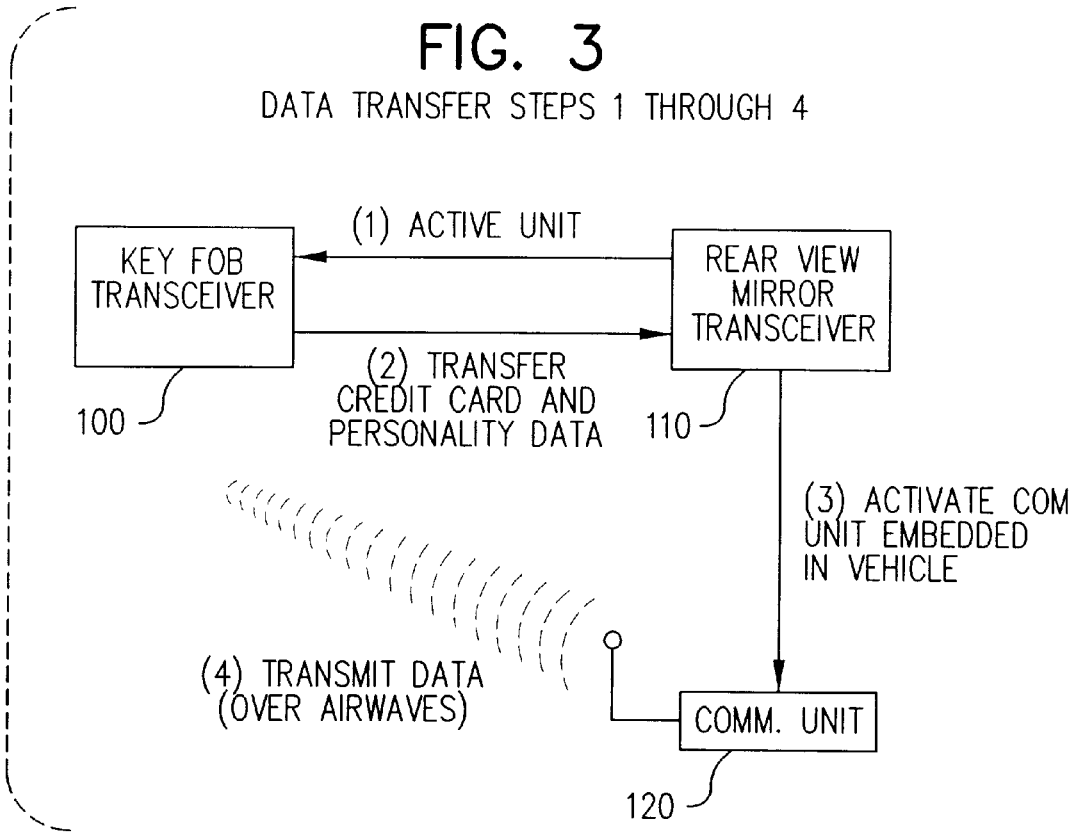

VIRTUAL CREDIT CARD ACCESS DEVICE FOR MOBILE COMMUNICATIONS EQUIPMENT

FIELD OF THE INVENTION

This invention relates generally to wireless communication systems and, in particular, to a method for paying for the usage of the equipment, including call charges attendant thereto.

BACKGROUND OF THE INVENTION

Almost since the inception of wireless communication devices, a niche market has emerged for the occasional or ad-hoc usage of communications devices such as fax machines, telephones, or pagers, either in flight (GTE Airphone), at the airport (kiosk facsimile machines), or in automobiles (Share-Technologies credit card telephones). The problem has always been in how to collect for the usage, and return to the customer a receipt for goods or services usage along with an itemized accounting.

Earlier, both 3-watt bag phones and hand-held communications devices have been rented at airports in vending machines (Sims Communications, Inc., etc.) wherein the call or usage charges were estimated in advance of incurrence, so that the owner of the equipment could pre-debit the user's credit card account, thereby insuring future payment of the account. Itemized statements were sometimes available later and otherwise lumped together as combined accounting statement. Later, in the case of the GTE Airphone and GTE rental car phones, the customer was required to slide his card through a slot in the telephone unit each time a call was to be placed, but still without any receipt.

Not until the customer received his credit card statement from the credit card issuer, at the end of the month, was he to know what he was being billed for the various calls.

Due to the size of most communication units (hand-helds), they are subject to either being misplaced or stolen, and it is for this reason that most lessors or vendors of rental telephone or communications equipment require an up-front deposit for the usage of the equipment, roughly equal to the value thereof.

In recent times, especially in rental car vehicles, the telephone units have reverted back to the larger 3-watt, fixed and installed types, offering both security for the unit itself and offering hands-free utilization as is now mandated by various States Legislatures and the Department of Motor Vehicles in the near and immediate future. We will soon see the use of a virtual telephone unit which operates on voice activation by the recognition of the spoken word and can then dial the requested party's number or perform other functions, all hands-free.

With the disappearance of the telephone handset and touch keypad, the only known presence of the phone might be by a tiny microphone embedded in the rear view mirror. This then will eliminate the concerns over theft or damage to the telephone unit, and at the same time create no distraction for the driver in the usage of the telephone. The only other issue which then may need to be addressed is the need for a virtual credit card and card reader mechanism to allow for accurate billings and to gain access to the system by the user.

BRIEF DESCRIPTION OF THE DRAWINGS

FIG. 1 illustrates a wireless communication system in accordance with the present invention as fully described herein.

FIG. 2 illustrates a logic diagram that may be used to implement the present invention.

FIG. 3 illustrates a block diagram describing the data transfer between the key chain unit, rear view mirror unit, and communications unit of the present invention.

DESCRIPTION OF THE PREFERRED EMBODIMENT

Generally, the present invention provides a method and apparatus for accessing a mobile communications device, such as a car telephone or other rental communications equipment, by utilizing a virtual (electronic account accessing) device. This is accomplished by providing a proximity key chain device, attached to the keys of the vehicle that contains information about the user and at the same time is only accessed at such time as the user is within close proximity to the RF receiving unit located at or within the vehicle itself. Once the user is within the close proximity of the receiving unit, the access may be either voluntary (by the push of a button), or involuntary, by automatic excitation of the RF transmitter by the receiving unit, once the proximity range has been met.

After the initial transmission by the access transmission device to the receiving unit, each and every subsequent access at the time the proximity is reached will only act to validate the same user access, but no data will need to be transferred except from the receiving unit to its base station, for the time duration and computation of accrued call charges that may be incurred. At the time the initial transfer occurs, other information about the user, such as language preference for utilizing the communications device and other pertinent user data, are all contained within the access transmission device.

Referring to FIGS. 1–3, the present invention discloses, in a wireless communication system, a method for transferring, storing and updating user credit card data and customer preference data to a communications device for purposes of validation and access to the communications device for its intended use.

Upon power-up of the receiver unit when the vehicle is first started, the rear view unit (110) sends an interrogation signal to the hand-held key chain unit (100) to read and verify the customer data and personality data contained therein (FIG. 2 step 204, FIG. 3 step 1). Rear view unit (110) may comprise a rear solar panel (111), embedded transit antenna (112), embedded PC board (113), and embedded receive antenna (114). The key chain unit (100) may comprise an internal battery (101), "911" button (102), "611" button (103), embedded circuit board (104) and embedded antenna (105), and maybe coupled to, for example, a car ignition key (106).

If the transmitting unit is within proximity range, for example, 30", the user data is then transferred (FIG. 3 step 2). If the rear view unit fails to receive an answer back (FIG. 2 step 206), access to the communication device (120) may be disabled (208).

The transmitted data is then compared to the last transmission to determine if this is the same as the last user data, or if this data constitutes a new user and personality group.

If the data is consistent with a known user from a previous transmission, the communications device being accessed is authorized to commence operation (FIG. 2 steps 210 and 212, FIG. 3 step 3). If the data transmitted is not consistent with known data from a previous transmission of data, then the data is stored as a new record, transmitted over the airwaves via the communication device being accessed and normal operations then occur.

The invention further contemplates the download of voice recognition phonems from a user look up table stored digitally in the hand-held user key chain unit to the communications device for instant user voice recognition in the spoken language of user's choice, and transference of frequently called telephone numbers as identified by an encoded name identifier in the specific language preference of the user (i.e. call "Bill").

The invention further contemplates transferring user call duration, number called, time of day, date, back to the hand-held user key chain module for later interrogation by the system computer at the rental counter or car company's office.

I claim:

1. In a wireless communication system for a vehicle, a method for transferring, storing and updating, user credit card data, and customer preference data from a hand-held key chain unit including a transceiver to a communications device for purposes of validation and access to the communications device for its intended use, the vehicle having a transceiver therein, a remote system administration location being employed to archive credit card user data comprising the following steps:

a) power up of the vehicle transceiver when the vehicle is first started, which sends an interrogation signal to the hand-held key chain unit to read and verify the customer data and personality data contained therein;

b) if the hand-held key chain transceiver is within proximity range of the vehicle transceiver, the user data is then transferred;

c) the transmitted data is compared to the last transmission to determine if this is the same as the last user data, or if this data constitutes a new user and personality group;

d) if the data is consistent with a known user from a previous transmission, the communications device being accessed is authorized to commence operation;

e) if the data transmitted is not consistent with known data from a previous transmission of data, then the data is stored as a new record, transmitted over the airwaves via the communications device, and a new user record and file is created at the remote system administration location;

f) in the case of a new user, the credit card data is verified and a validation occurs which then allows the new user to gain access to the communications device being accessed and normal operations then occur.

2. The method of claim 1 further comprising the steps of:

e) the download of voice recognition phonems from a user look up table stored digitally in the hand held user key chain unit, to the communications device for instant user voice recognition in the spoken language of user's choice; and f) transference of frequently called telephone numbers as identified by an encoded name identifier in the specific language preference of the user (i.e. call "Bill").

3. The method of claim 2 further comprising the steps of:

g) transferring user call duration, number called, time of day, date, back to the hand held user key chain module for later interrogation by the system computer at the rental counter or car company's office.

* * * * *